United States Patent
Bush

(10) Patent No.: US 11,139,963 B2
(45) Date of Patent: Oct. 5, 2021

(54) COMMUNICATION SYSTEMS AND METHODS

(71) Applicant: General Electric Company, Schenectady, NY (US)

(72) Inventor: Stephen Francis Bush, Latham, NY (US)

(73) Assignee: General Electric Company, Schenectady, NY (US)

( * ) Notice: Subject to any disclaimer, the term of this patent is extended or adjusted under 35 U.S.C. 154(b) by 210 days.

(21) Appl. No.: 16/569,272

(22) Filed: Sep. 12, 2019

(65) Prior Publication Data

US 2021/0083866 A1  Mar. 18, 2021

(51) Int. Cl.
| | |
|---|---|
| H04B 10/00 | (2013.01) |
| H04L 9/08 | (2006.01) |
| H04B 10/25 | (2013.01) |
| H04B 10/70 | (2013.01) |
| H04J 14/00 | (2006.01) |

(52) U.S. Cl.
CPC ........... H04L 9/0858 (2013.01); H04B 10/25 (2013.01); H04B 10/70 (2013.01)

(58) Field of Classification Search
CPC ....... H04B 10/70; H04B 10/85; H04L 9/0852; H04L 9/0855
See application file for complete search history.

(56) References Cited

U.S. PATENT DOCUMENTS

| | | |
|---|---|---|
| 7,221,812 B2 | 5/2007 | Lagasse |
| 8,244,082 B2 | 8/2012 | Pacher et al. |
| 8,611,534 B2 | 12/2013 | Finlayson et al. |
| 8,749,875 B2 | 6/2014 | Benton et al. |
| 9,201,207 B2 | 12/2015 | Varkey et al. |
| 9,800,352 B2 | 10/2017 | Frohlich et al. |
| 2016/0195675 A1 | 7/2016 | Horn |
| 2019/0379463 A1* | 12/2019 | Shields ................. H04L 9/0852 |
| 2020/0044835 A1* | 2/2020 | Legre ............... H04B 10/07955 |

\* cited by examiner

*Primary Examiner* — Daniel G Dobson
(74) *Attorney, Agent, or Firm* — Eversheds Sutherland (US) LLP

(57) ABSTRACT

A communication system is provided that includes a first quantum key distribution device configured to be coupled to a second quantum key distribution device over a quantum channel that communicates a quantum state via the quantum channel, a classical device coupled to the first quantum key distribution device with a connection cable to provide a communication path between the classical device and the first quantum key distribution device, and a quantum channel carrier engaging the connection cable. The quantum channel carrier is configured to, responsive to movement of the connection cable, disrupt a quantum state within the quantum channel.

20 Claims, 2 Drawing Sheets

COMMUNICATION SYSTEMS AND METHODS

GOVERNMENT LICENSE RIGHTS

This invention was made with government support under contract number DE-OE0000894 awarded by the Department of Energy. The government has certain rights in the invention.

FIELD

The subject matter described herein relates to sharing non-publicly available information (e.g., secret information) within computerized communication networks, and protection for these communication networks.

BACKGROUND

Quantum key distribution uses components of quantum mechanics by allowing computing devices (e.g., computers, sensors, controllers, etc.) to produce a shared random secret key known only to the computing devices. This shared key is used to encrypt and decrypt messages communicated between the computing devices. Information can be encoded in quantum states (e.g., qubits) instead of bits, which allows the computing devices to detect when a third party computing device is attempting to detect or listen in to the communications using the quantum key. This third party attempt can introduce errors during reception of the shared quantum key, which is detected by one or more of the computing devices.

While quantum key distribution devices share information over a quantum channel, information in systems that use quantum key distribution devices pass information through classical devices, including cables and wires that may mechanically connect to a quantum key distribution device. These devices may be prone to physical attacks and tampering, resulting in secret information being stolen by bad actors.

BRIEF DESCRIPTION

In one or more embodiments, a communication system is provided that includes a first quantum key distribution device configured to be coupled to a second quantum key distribution device over a quantum channel that communicates a quantum state via the quantum channel. A classical device is coupled to the first quantum key distribution device with a connection cable to provide a communication path between the classical device and the first quantum key distribution device. A quantum channel carrier engages the connection cable, and the quantum channel carrier is configured to disrupt a quantum state within the quantum channel responsive to movement of the connection cable.

In one or more embodiments, a communication system is provided that includes a first quantum key distribution device configured to be coupled to a second quantum key distribution device over a quantum channel that communicates a quantum state via the quantum channel. A classical device is coupled to the first quantum key distribution device with a connection cable having at least one conductive wire that provides a communication path between the classical device and the first quantum key distribution device. A quantum channel carrier encases the at least one conductive wire of the connection cable. The quantum channel carrier is configured to disrupt the quantum state within the quantum channel responsive to movement of the connection cable. The quantum channel carrier also is configured to disrupt the quantum state within the quantum channel responsive to cyber-based access of the quantum channel carrier by a remote device.

In one or more embodiments, a method of detecting physical tampering of a classical connection cable is provided that includes coupling a quantum channel carrier to a conductive wire of a classical connection cable to move when the conductive wire moves. Quantum states are communicated through the quantum channel carrier, and errors are determined related to the quantum states. A determination is made as to whether a total amount of the errors over a predetermined interval exceeds a threshold error limit to indicate physical tampering of the classical connection cable.

BRIEF DESCRIPTION OF THE DRAWINGS

A full and enabling disclosure of the present disclosure is set forth in the specification, which refers to the appended Figures, in which.

DETAILED DESCRIPTION

Figure 1:
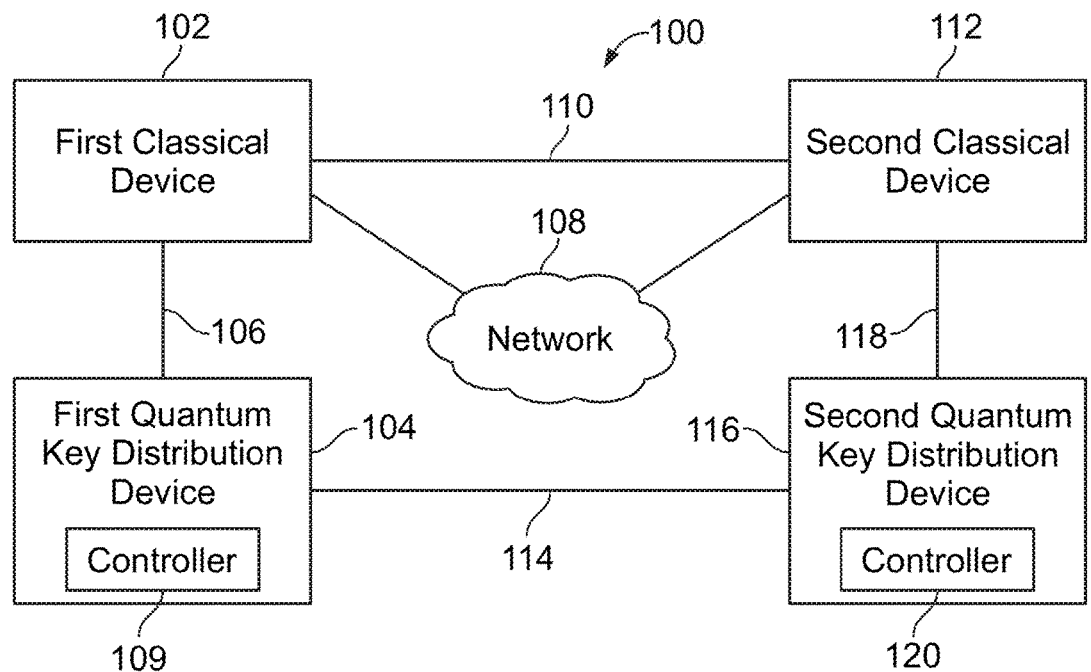
FIG. 1 is a schematic block diagram of an example communication system in accordance with embodiments herein.

Reference now will be made in detail to embodiments of the present disclosure, one or more examples of which are illustrated in the drawings. Each example is provided by way of explanation of the present disclosure, and is not a limitation of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Provided is a communication system that utilizes a quantum channel in association with a classical connection cable or wires therein so that when an individual tampers with the classical connection cable, a quantum state is disturbed within the quantum channel. Disturbance of this state indicates that tampering has occurred. A quantum channel transmits a quantum key based on principles of quantum mechanics, such as by transmitting signals that include qubits, or provide information in quantum states. Because the quantum signal is based on principles of quantum mechanics, if a third party attempts to eavesdrop to determine the quantum key being transmitted in the quantum states, the quantum state is disturbed and the third party is detected. Specifically, when the quantum state is disturbed, an anomaly in the signal is detected where a threshold number of anomalies detected indicates a third party is attempting to gain access to the signal.

The quantum signal is transmitted through the quantum channel along one or more optical fibers, and is effective at preventing third parties from gaining access to the signal.

However, in addition to the quantum channel, the classical channel is provided for communicating data and information through signals to complete the formation of the key. The classical channel may be a serial cable, Ethernet cable, other similar cable, wire-based hardware, or the like that provides a communication signal between two devices. Unlike the quantum channel, the classical channel may be subject to physical attack, or tampering, by a third party, rendering the advantages of the quantum key distribution wasted.

The figures illustrate a system and method for a quantum key distribution system that reduces the amount of harm that may occur from a physical attack on a classical channel of the quantum key distribution system. In particular, the quantum channel of the quantum key distribution system is physically routed along, within, or around portions of the quantum key distribution device that includes a classical connection cable. Thus, when someone modifies or attempts to physically modify the classical connection cable, the quantum channel also may be modified, interfered with, or moved. Each results in the disturbance of the quantum signal in the quantum channel, providing detection of the physical attempt to tamper with the classical channel.

The quantum channel may be encased in a classical cable or wire such that tampering causes a disturbance of a quantum signal in the quantum channel. Movement of the classical cable causes movement of the encased quantum channel. In this manner, the quantum channel may provide dual protection functionality, to protect the communication system from hackers attempting to access the communication system through a cyberattack, and from individuals attempting to physically tamper with a classical channel.

The classical devices described herein can include a device, channel, component, wiring, cable, communication pathway, etc. that provide or enable communication through networks not providing quantum information. Examples of classical systems are wire-based systems, systems using wire-based protocols, wireless-based systems, systems using wireless-based protocols, or the like, that communicate over a network, server, or the like between devices. Such wire and wireless-based systems include, but are not limited to Ethernet, phone line systems, broadband systems, systems using unshielded twisted pair cable, systems using coaxial cables, cellular systems, fiber optic systems, internet-based systems, or the like.

Quantum key distribution devices described herein can include any and all systems and methods that utilize quantum mechanics, including the use of quantum states to transmit key-based information through a quantum channel that may be used to allow two remote devices to securely communicate and share data and information. Example quantum states include photon polarization states, orthogonal states, other conjugate states, entangled based states, or the like.

A quantum channel described herein may include any pathway through which quantum states pass to communicate information or data, including pathways through which quantum states are transmitted from a first device to a second device using properties of quantum mechanics. Example quantum channels include pathways through optical fiber, a bundle of optical fiber, or the like.

FIG. 1 illustrates a quantum key distribution system 100 that not only protects users from cyberattacks, but additionally provides detection of physical tampering attacks to the classical components of the system 100. The quantum key distribution system 100 includes a first classical device 102 that is coupled to a first quantum key distribution device 104 via a first classical connection cable 106 for sending secure messages over a network 108. In one example, the first classical connection cable 106 is formed by integrating a quantum channel carrier (FIG. 2) within classical wiring (FIG. 2) as will be described in further detail in relation to FIG. 2. The first quantum key distribution device 104 may include a first controller 109 that has one or more processors that may be configured to execute programs or protocols to determine when to transmit a quantum signal and that may receive a quantum signal. In an example, the first controller 109 may also be configured to detect errors in the quantum signal, count the number of errors detected in predetermined intervals, determine a count of errors exceeds a threshold value over a predetermined interval, and transmit a communication to alert an individual that an error, or threshold amount of errors has been detected.

The quantum key distribution system 100 may also include a second classical cable 110 that provides a communication path between the first classical device 102 and a second classical device 112. The second classical cable 110 may be a coaxial cable, unshielded twisted pair cable, an Ethernet cable, or the like. In other example embodiment, the first classical device 102 and second classical device 112 are coupled through a wireless protocol, or in a wireless manner. The coupling between the first classical device 102 and the second classical device 112 may include a cellular coupling, be through the network 108, server, or the like.

A quantum channel cable 114 provides a communication pathway between the first quantum key distribution device 104 and a second quantum key distribution device 116 that is coupled to the second classical device 112 via a third classical connection cable 118. Similar to the first classical connection cable 106, in one example, the third classical connection cable 118 is formed by integrating a quantum channel carrier (FIG. 2) within classical wiring (FIG. 2) of the third classical connection cable 118 as will be described in further detail in relation to FIG. 2.

The second quantum key distribution device 116 may include a second controller 120 that has one or more processors that may be configured to execute programs or protocols to determine when to transmit a quantum signal and that may receive a quantum signal. In an example, the second controller 120 may also be configured to detect errors in the quantum signal, count the number of errors detected in predetermined intervals, determine a count of errors exceeds a threshold value over a predetermined interval, and transmit a communication to alert an individual that an error, or threshold amount of errors has been detected.

In general, the first quantum key distribution device 104, referred to as "Alice" of the quantum key distribution (QKD) system 100, transmits messages via a quantum channel within the quantum channel cable 114 to the second quantum key distribution device 116, referred to as "Bob". While in this example the first quantum key distribution device 104 transmits the messages and the second quantum key distribution device 116 receives the messages, in other example embodiments, the second quantum key distribution device 116 transmits the message and is considered "Alice" while the first quantum key distribution device 104 receives the message and is considered "Bob".

The quantum channel within the quantum channel cable 114 may be formed from an optical fiber, or bundle of optical fibers that transmit quantum states along their path. The optical fiber may be disposed within the quantum channel cable 114 and may receive an input from a laser or other photon generating source. Any cyberattack attempts to access or monitor the quantum channel results in modification of the channel, disrupting the quantum state and causing an error. This error may be detected to warn a user of a potential hacker or eavesdropper (often referred to as "Eve") attempting to improperly access the quantum channel. By physically integrating at least a portion of the quantum channel within the first and/or third classical connection cables 106 and/or 118, in addition to detecting a cyberattack attempt to access the quantum channel, physical tampering of the classical connection cable 106 and/or 118 causes movement, and thus disturbance of the quantum channel. Responsive to the movement caused by the physical tampering, disruption of the quantum state may be detected. Consequently, the quantum channel may have a dual purpose of detecting cyberattacks and physical tampering attacks accordingly.

Figure 2:
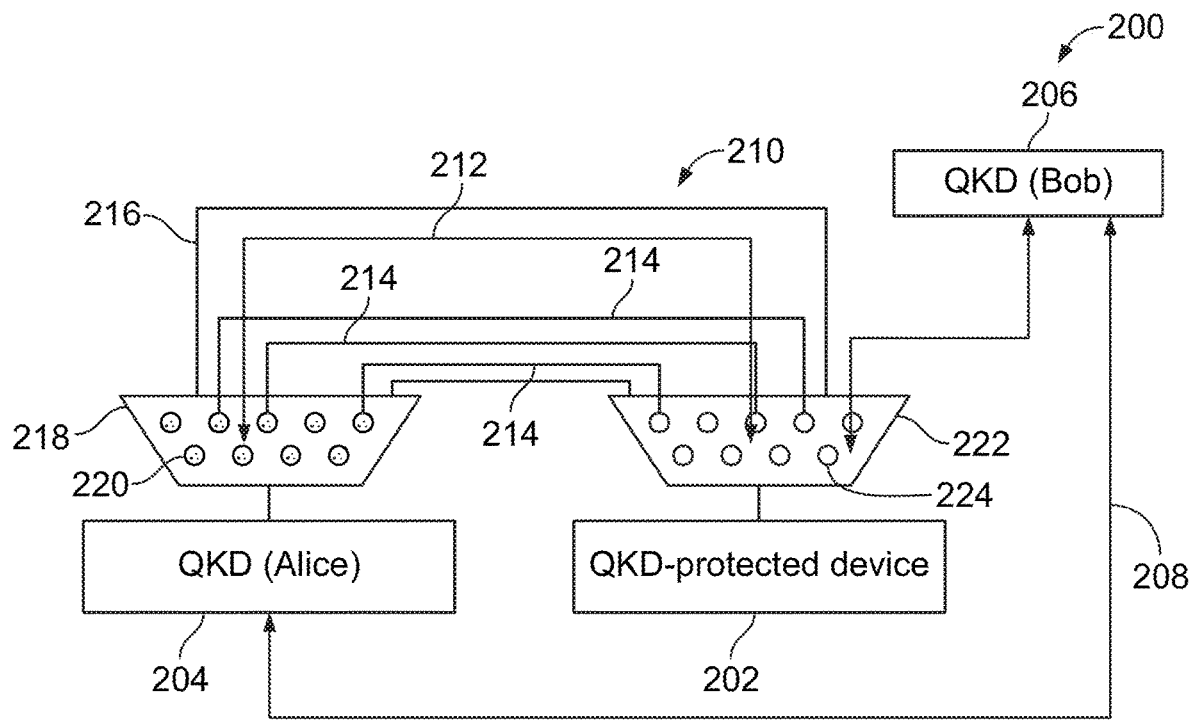
FIG. 2 is a schematic block diagram of an example quantum key device in accordance with embodiments herein.

FIG. 2 schematically illustrates an example of a quantum key distribution system 200 with a classical device 202, a first quantum key distribution device 204, and a second key distribution device 206 that receives a communication through a quantum channel cable 208 from the first quantum key distribution device 204. Also illustrated is a classical connection cable 210 that includes a quantum channel carrier 212 that is integrated with classical wires 214 within the sleeve 216 of the classical connection cable 210. In one example, the classical device 202 may be the first classical device 102 of FIG. 1 or may be the second classical device 112 of FIG. 1, the first quantum key distribution device 204 may be the first quantum key distribution device 104 of FIG. 1, the second quantum key distribution device 206 may be the second quantum key distribution device 116 of FIG. 1, the quantum channel cable 208 may be the quantum channel cable 114 of FIG. 1, and the classical connection cable 210 may be first classical connection cable 106 of FIG. 1. In another example, the classical connection cable 210 may be the third classical connection cable 118 of FIG. 1.

In one example embodiment, the classical connection cable 210 may be a RS-232 type of cable, an Ethernet cable, or the like. For example, the connection cable may include a first connector plug 218 that include pins 220 that each may be configured to connect to a classical wire 214. The classical wires 214 may include ground wires, transmission wires, receiver wires, and the like. Integrated with the classical wires 214 is the quantum channel carrier 212. The quantum channel carrier 212 may include an optical fiber that carries quantum states and engages at least on classical wire 214. In one embodiment, the quantum channel carrier 212 may be an optical fiber the wraps around one or more than one classical wire 214. In yet another example, at least one classical wire 214 may be encased by the quantum channel carrier 212, whereas alternatively, in another embodiment, the quantum channel carrier 212 may be encased in one or more classical wires 214.

The first connector plug 218 mates with and is received by an outlet of the first quantum key distribution device 204 to provide an electrical and physical connection between the classical connection cable 210 and first quantum key distribution device 204. Optionally, locking mechanisms (not shown) may be used to additionally secure the first connector plug 218 to the first quantum key distribution device 204.

The classical connection cable 210 extends from the first connector plug 218 to a second connector plug 222 that includes pins 224 and receives the classical wires 214 to provide a communication path and physical connection between the classical wires 214 and second connector plug 222. The second connector plug is matingly received by an inlet of the classical device 202 to provide a communication pathway between the first quantum key distribution device 204 and classical device 202. The quantum channel carrier 212 is coupled within the classical connection cable 210 and routed around or through the classical device 202. By providing this routing, the quantum channel carrier 212 may be used to detect movement of the classical connection cable 210 during use. In one example, the movement is caused by an individual tampering with the cable and additional protection against such tampering is provided. In another example, the cable may accidentally moved, causing damage, or the cable to become detached and the quantum channel carrier 212 may indicate the movement, causing a user to be alerted to check the cable connection. Alternatively, in one example, to prevent detection of photon polarizing as a result of fiber twisting because of external factors such as wind, or other phenomenon, polarization compensation is utilized to ignore the change in photon polarizing due to fiber twisting. The polarization compensation may be enabled and disabled by a controller. In one example a sensor or detector may detect environmental conditions and the controller may determine the likelihood that a change in photon polarizing due to fiber twisting may occur. Then, based on the likelihood, the controller may enable the polarization compensation when the likelihood is above a predetermined threshold, and may disable the polarization compensation when the likelihood is below a predetermined threshold. In other embodiments, a look up table, algorithm, or the like may be used to determine when to enable and disable the polarization compensation.

In one example, the quantum channel carrier 212 physically engages the classical connection cable 210, and specifically at least one classical wire 214. Consequently, physical movement of the wire 214 results in physical movement of the quantum channel carrier 212. The physical movement of the quantum channel carrier 212 disturbs quantum states transmitted along the quantum channel carrier 212. The disturbance of the quantum signal results in the disturbance of the quantum state such that the quantum signal is not received, or altered before reaching the second quantum key distribution device 206. This missed or altered quantum signal is detected to alert a user of a potential attempt to tamper with the classical connection cable 210. Thus, the connection cable 210 and quantum channel carrier 212 are coupled such that responsive to the movement of the connection cable 210 caused by physical tampering, disruption of the quantum state may be detected.

The quantum channel carrier 212 provides several functional protections. As one example, the quantum signal is disturbed if an individual at a remote computing device attempts to access the quantum signal. The attempted cyberattack or monitoring automatically alters the quantum state that is detected by the second quantum key distribution device 206. As another example, an attempt to physically tamper with the classical connection cable 210 causes movement and disturbance of the quantum signal, altering or destroying the quantum signal, also detected by the second quantum key distribution device 206. Therefore, a dual-purpose quantum channel carrier 212 is provided for the quantum key distribution system, providing additional functionality and protection.

In the example embodiment of FIG. 2 the first classical device 202 and first quantum key distribution device 204 are shown as separate devices that are electrically connected and/or in communication with the connection cable 210. In other example embodiments, the first classical device 202 and the first quantum key distribution device 204 are within a common housing. In yet another example, the quantum channel carrier 212 is on a chip that is conductively coupled within and in communication with the classical device 202. Thus, the current system and methodology may be used on existing quantum key distribution systems 200, or may be manufactured as part of a classical device 202. Specifically, in an example embodiment when the quantum channel carrier 212 is on a chip, the communication pathways, including wires, provided to the chip, such that movement or tampering with the chip also results in movement of the quantum channel carrier 212 and detection of the tampering activity.

Figure 3:
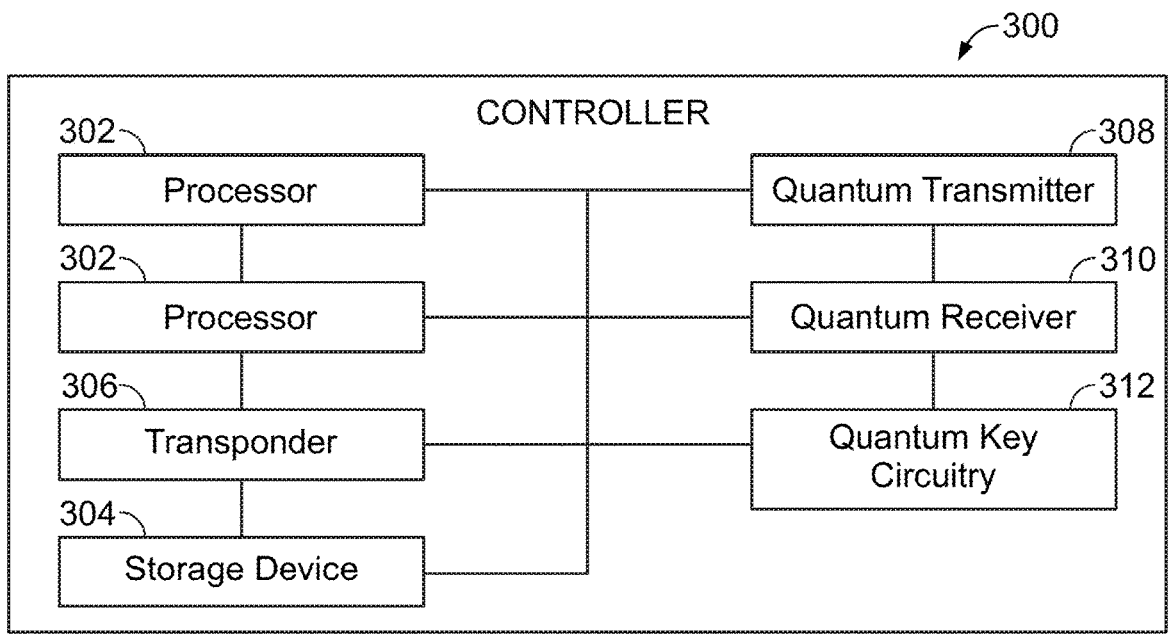
FIG. 3 is a schematic diagram of a controller for a quantum key distribution system in accordance with embodiments herein.

FIG. 3 illustrates a schematic diagram of a controller 300 for a quantum key distribution system including in example embodiments the quantum key distribution system 200 of FIG. 2. In one example, the controller 300 is the first controller 109 of FIG. 1, while in another example the controller 300 is the second controller 120 of FIG. 1. While the first and second controllers 109 and 120 of FIG. 1 are described as controllers for the first quantum key distribution device 104 and the second quantum key distribution device 116, the controller of FIG. 3 may also be a controller within a classical device, remote device, or the like that is able to determine errors, and if a threshold amount of errors has been reached based on received quantum signals.

The controller 300 includes one or more processors 302, a storage device 304, a transponder 306, a quantum transmitter 308, a quantum receiver 310, and quantum key circuitry 312.

The storage device 304 may include a short term memory device, a long term memory device, or the like to store data, including quantum signal related data and information. This includes the amount of errors of quantum signals or quantum states in predetermined time intervals. The transponder 306 transmits communications to remote devices and receives communications from remote devices.

The quantum transmitter 308 forms and transmits a quantum signal including quantum states sent from a first quantum key distribution device and received by the quantum receiver 310 of a second quantum key distribution device via the quantum channel. In one example, the quantum transmitter is a laser that emits photons that are carried along an optical fiber between the first quantum key distribution device and the second quantum key distribution device. The quantum transmitter 308 may form quantum states that include differing polarization states, orthogonal states, other conjugate states, entangled based states, or the like that may be received to provide a key, secret information, or the like between the first and second quantum devices.

The quantum key circuitry 312 is able to receive the quantum signal, or determine if an error has occurred. The quantum key circuitry 312 also forms the quantum key to be used by a classical device. Additionally, the quantum key circuitry 312 determines the amount of errors that occur during a predetermined interval. In one example the predetermined interval is in a range between 0 minutes and 5 minutes. In other examples the predetermined interval is greater than 5 minutes. In another example the predetermined interval is between 500 milli-seconds and 2 seconds. In one example the threshold error limit is 1 error during the predetermined period. In other examples 10 errors or more for a predetermined period is the threshold error limit. In other examples plural predetermined intervals are provided where in a threshold number of errors does not exceed a 10 sec-based threshold, the one or more processors continues to monitor and if as a result of additional errors in a 20 sec-based threshold is exceeded. The quantum key circuitry may perform functions and calculations of an algorithm or communicate with software in order to make these determinations. Therefore, the quantum key circuitry 312 can determine when and error occurs, or a threshold of errors over a predetermined interval has occurred. When an error is detected, or an error threshold is exceeded, the quantum key circuitry 312 also transmits a communication to the one or more processors, to a remote device, or the like to display the error for alerting an individual of the error, or that the threshold errors have been exceeded. In this manner the quantum key circuitry 312 alerts of an issue.

Figure 4:
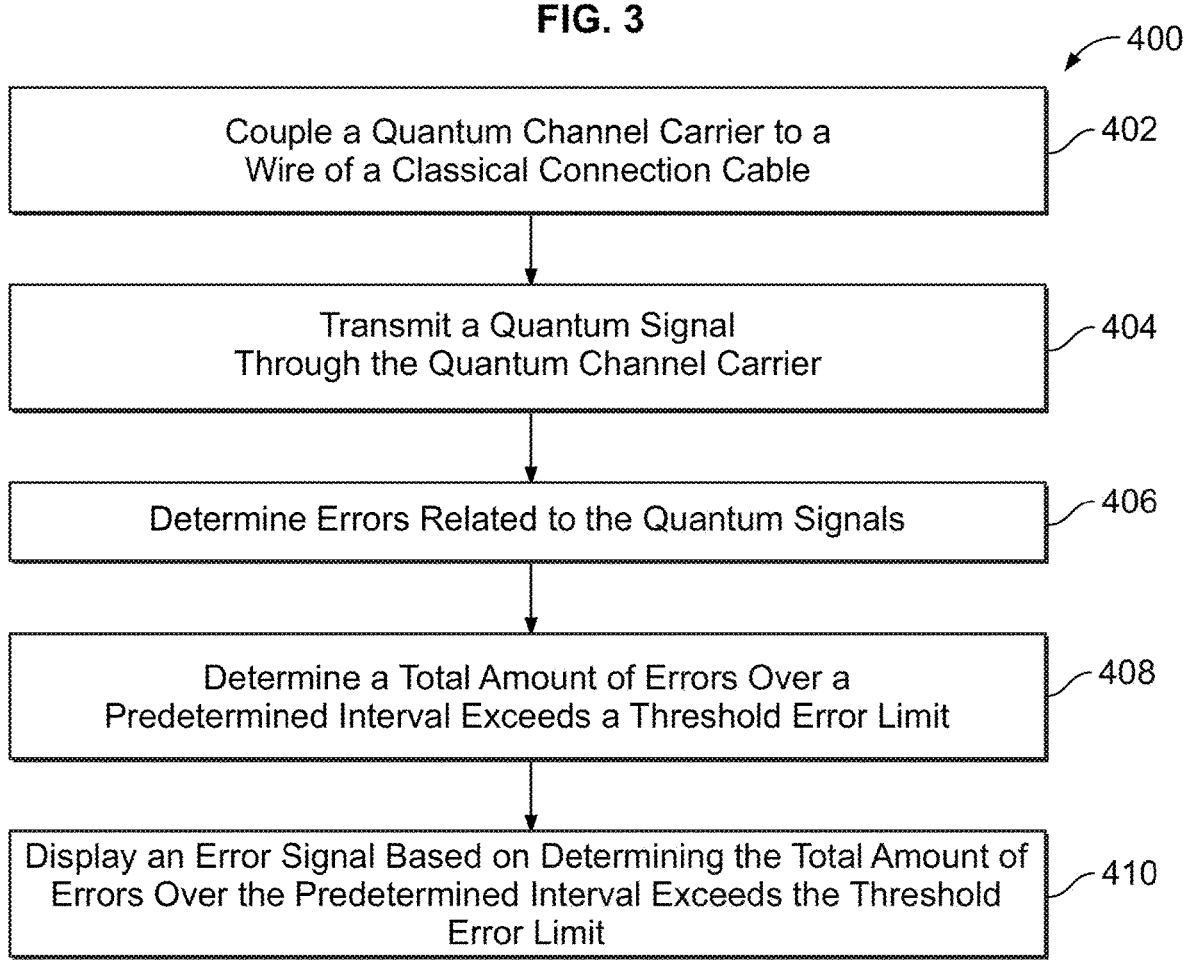
FIG. 4 is a flowchart describing an example process block flow diagram of a method detecting movement of a classical cable connection in accordance with embodiments herein.

FIG. 4 illustrates a schematic block flow diagram of a method 400 for detecting movement of a classical cable connection. In one example the movement is caused by physical tampering of a classical connection cable. In other examples, the movement may be caused by the classical connection cable being accidentally moved or disconnected. Alternatively, a natural even may result in the classical connection cable from being used. In example embodiments the quantum key distribution system 100 of FIG. 1 may be used to accomplish this method. In another example, the quantum key distribution system 200 similarly may be used to accomplish the method provided. By detecting the movement of the classical connection cable as a result of tampering, accident, or otherwise, a user may be alerted that the classical connection cable between a quantum key distribution device and a classical device has been physically disturbed.

At 402, a quantum channel carrier is coupled to a wire of a classical connection cable to move when the wire moves. In one example the classical connection cable extends between a classical device and first quantum key distribution device to provide a communication pathway between the first quantum key distribution device and the classical device. In another example, the quantum channel carrier is an optical fiber that is encased within the wire. In alternative examples the optical fiber is wrapped around the wire, is disposed within the same sleeve as the wire, or the like to provide a coupling that causes movement of the optical fiber when the wire similarly moves. The quantum channel carrier is routed through classical device and coupled to a second quantum key distribution device to provide a quantum channel pathway between the first quantum key distribution device and the second quantum key distribution device.

At 404, a quantum signal is transmitted through the quantum channel carrier. In one example the quantum signal is a photon based signal that provides various quantum states. In one example the quantum signal carries secret information, including key-information for providing a temporary key for use in sharing secret information.

At 406, one or more processors determines errors related to the quantum signals. In one example the quantum signals are photon-based signals where errors are presented when the quantum states transmitted by a first quantum key distribution device are not received by a second quantum key distribution device. In particular, physical tampering and movement of the quantum channel carrier results in disturbing the quantum channel and causing the second quantum key distribution device not to receive the quantum signals in the quantum state as transmitted. This disturbance is then detected as an error. Therefore, tampering leads an increase in errors detected and consequently determined by the one or more processors.

At 408, the one or more processors determine a total amount of errors over a predetermined interval exceeds a threshold error limit to indicate movement of the classical connection cable. In one example the predetermined interval is in a range between 0 minutes and 5 minutes. In other examples the predetermined interval is greater than 5 minutes. In another example the predetermined interval is between 500 milli-seconds and 2 seconds. In one example the threshold error limit is 1 error during the predetermined period. In other examples 10 errors or more for a predetermined period is the threshold error limit. In other examples plural predetermined intervals are provided where in a threshold number of errors does not exceed a 10 sec-based threshold, the one or more processors continues to monitor and if as a result of additional errors in a 20 sec-based threshold is exceeded. In one example, the one or more processors use an algorithm to calculate whether the amount of errors exceeds the threshold. In another example a look-up table is used. In yet another example a formula or other mathematical equation is used to determine if the threshold number of errors is exceeded. In each example, when the threshold amount of errors is exceeded is indicated.

At 410, the one or more processors display an error signal based on determining the total amount of errors over the predetermined interval exceeds the threshold error limit. In one example, the display is part of the classical device, whereas in other examples the display is that of one of the quantum key distribution devices. Alternatively, the error signal may be transmitted to more than one display screen of more than one device. In other examples an audible alarm including beeping may occur. In other embodiment an electronic message is sent to an email account alerting an individual that the threshold error limit has been exceeded. In other examples, a text message is sent to a Smart device such as a tablet, smart phone, or the like to alert an individual of the threshold error limit being exceeded. Similarly, a third party responsible for computer security may receive an electronic or text message accordingly as well. In this manner, not only does the use of the quantum channel provide an extra safety measure for a classical line, the system may be used to alert individuals that movement of the classical connection cable has occurred. When this movement is caused by an attacker tampering with the classical connection cable, the alert assists in catching the individual tampering with the classical line. Alternatively, when the classical connection cable has been moved as a result of an accident, or other reason, by alerting a user, the user may check the connection to ensure a secure connection is still provided.

In one or more embodiments a communication system is provided that includes a first quantum key distribution device configured to be coupled to a second quantum key distribution device over a quantum channel that communicates a quantum state via the quantum channel. A classical device is coupled to the first quantum key distribution device with a connection cable to provide a communication path between the classical device and the first quantum key distribution device. A quantum channel carrier engages the connection cable, and the quantum channel carrier is configured to, responsive to movement of the connection cable, disrupt a quantum state within the quantum channel.

Optionally, the connection cable includes at least one conductive wire that engages the quantum channel carrier. Alternatively the quantum channel carrier is encased in the at least one conductive wire.

In one example the quantum channel carrier is an optical fiber. Optionally, the first quantum key distribution device includes a laser that emits a photon into the optical fiber to provide the quantum state. In another aspect the quantum channel carrier is on a chip conductively coupled to the classical device.

In one example the connection cable is one of an RS-232 cable or an Ethernet cable. In another example the second quantum key distribution device is configured to detect when the quantum state is disrupted responsive to movement of the connection cable. Optionally, the second quantum key distribution device is further configured to detect when a remote computing device is monitoring the quantum channel carrier.

In one or more other embodiments a communication system is provided that includes a first quantum key distribution device configured to be coupled to a second quantum key distribution device over a quantum channel that communicates a quantum state via the quantum channel. A classical device is coupled to the first quantum key distribution device with a connection cable having at least one conductive wire that provides a communication path between the classical device and the first quantum key distribution device. A quantum channel carrier is encased in the at least one conductive wire of the connection cable. The quantum channel carrier is configured to, responsive to movement of the connection cable, disrupt the quantum state within the quantum channel, and responsive to cyber-based access of the quantum channel carrier by a remote device, disrupt the quantum state within the quantum channel.

Optionally, the quantum channel carrier is an optical fiber. In another aspect the connection cable is one of an RS-232 cable or an Ethernet cable. In yet another aspect the second quantum key distribution device is configured to detect when the quantum state is disrupted within the quantum channel carrier. In an example the quantum state is one of a photon polarization state, an orthogonal state, a conjugate state, or an entangled state.

In one or more embodiments a method of detecting physical tampering of a classical connection cable is provided that includes coupling a quantum channel carrier to a conductive wire of a classical connection cable to move when the conductive wire moves, and communicating quantum states through the quantum channel carrier. Errors related to the quantum states are determined, and a determination is made whether a total amount of the errors over a predetermined interval exceeds a threshold error limit to indicate physical tampering of the classical connection cable.

Optionally the method includes displaying an error signal based on determining the total amount of the errors determined over the predetermined interval exceeds the threshold error limit. In one example the predetermined interval is between 500 milli-seconds and 2 seconds.

In one aspect determining the errors related to the quantum state includes detecting a disturbance of a quantum state of the quantum states. In another aspect the quantum channel carrier includes an optical fiber, and the method also includes encasing the optical fiber within the conductive wire of the classical connection cable. In yet another aspect the quantum states include one or more of a photon polarization state, an orthogonal state, a conjugate state, or an entangled state.

While the present disclosure has been described in terms of one or more particular embodiments, it is apparent that other forms could be adopted by one skilled in the art. It is to be understood that the use of "comprising" in conjunction with the alloy compositions described herein specifically discloses and includes the embodiments wherein the alloy compositions "consist essentially of" the named components (i.e., contain the named components and no other components that significantly adversely affect the basic and novel features disclosed), and embodiments wherein the alloy compositions "consist of" the named components (i.e., contain only the named components except for contaminants which are naturally and inevitably present in each of the named components).

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A communication system comprising:
   a first quantum key distribution device configured to be coupled to a second quantum key distribution device over a quantum channel that communicates a quantum state via the quantum channel;
   a classical device coupled to the first quantum key distribution device with a connection cable to provide a communication path between the classical device and the first quantum key distribution device; and
   a quantum channel carrier engaging the connection cable, wherein the quantum channel carrier is configured to, responsive to movement of the connection cable, disrupt a quantum state within the quantum channel.

2. The communication system of claim 1, wherein the connection cable includes at least one conductive wire that engages the quantum channel carrier.

3. The communication system of claim 2, wherein the quantum channel carrier is encased in the at least one conductive wire.

4. The communication system of claim 1, wherein the quantum channel carrier is an optical fiber.

5. The communication system of claim 4, wherein the first quantum key distribution device includes a laser that emits a photon into the optical fiber to provide the quantum state.

6. The communication system of claim 1, wherein the quantum channel carrier is on a chip conductively coupled to the classical device.

7. The communication system of claim 1, wherein the connection cable is one of an RS-232 cable or an Ethernet cable.

8. The communication system of claim 1, wherein the second quantum key distribution device is configured to detect when the quantum state is disrupted responsive to movement of the connection cable.

9. The communication system of claim 8, wherein the second quantum key distribution device is further configured to detect when a remote computing device is monitoring the quantum channel carrier.

10. A communication system comprising:
    a first quantum key distribution device configured to be coupled to a second quantum key distribution device over a quantum channel that communicates a quantum state via the quantum channel;
    a classical device coupled to the first quantum key distribution device with a connection cable having at least one conductive wire that provides a communication path between the classical device and the first quantum key distribution device; and
    a quantum channel carrier encased in the at least one conductive wire of the connection cable,
    wherein the quantum channel carrier is configured to, responsive to movement of the connection cable, disrupt the quantum state within the quantum channel, and responsive to cyber-based access of the quantum channel carrier by a remote device, disrupt the quantum state within the quantum channel.

11. The communication system of claim 10, wherein the quantum channel carrier is an optical fiber.

12. The communication system of claim 10, wherein the connection cable is one of an RS-232 cable or an Ethernet cable.

13. The communication system of claim 10, wherein the second quantum key distribution device is configured to detect when the quantum state is disrupted within the quantum channel carrier.

14. The communication system of claim 10, wherein the quantum state is one of a photon polarization state, an orthogonal state, a conjugate state, or an entangled state.

15. A method of detecting physical tampering of a classical connection cable comprising:
    coupling a quantum channel carrier to a conductive wire of a classical connection cable to move when the conductive wire moves;
    communicating quantum states through the quantum channel carrier;
    determining errors related to the quantum states; and
    determining a total amount of the errors determined over a predetermined interval exceeds a threshold error limit to indicate physical tampering of the classical connection cable.

16. The method of claim 15, further comprising displaying an error signal based on determining the total amount of the errors determined over the predetermined interval exceeds the threshold error limit.

17. The method of claim 16, wherein the predetermined interval is between 500 milli-seconds and 2 seconds.

18. The method of claim 15, wherein determining the errors related to the quantum state includes detecting a disturbance of a quantum state of the quantum states.

19. The method of claim 15, wherein the quantum channel carrier includes an optical fiber, and the method further comprises encasing the optical fiber within the conductive wire of the classical connection cable.

20. The method of claim 15, wherein the quantum states include one or more of a photon polarization state, an orthogonal state, a conjugate state, or an entangled state.

* * * * *